(12) United States Patent
Seitz (10) Patent No.: US 10,154,761 B2
(45) Date of Patent: Dec. 18, 2018

(54) COVER FOR FOOD ITEMS PLACED ON A COOKING SURFACE

(71) Applicant: AccuTemp Products, Inc., Fort Wayne, IN (US)

(72) Inventor: Gary Seitz, Decatur, IN (US)

(73) Assignee: AccuTemp Products, Inc., Fort Wayne, IN (US)

( * ) Notice: Subject to any disclaimer, the term of this patent is extended or adjusted under 35 U.S.C. 154(b) by 401 days.

(21) Appl. No.: 14/694,464

(22) Filed: Apr. 23, 2015

(65) Prior Publication Data

US 2016/0029845 A1 Feb. 4, 2016

Related U.S. Application Data

(60) Provisional application No. 62/030,219, filed on Jul. 29, 2014.

(51) Int. Cl.
  *A47J 37/00* (2006.01)
  *A47J 43/20* (2006.01)
  *A47J 37/06* (2006.01)
  *A47J 37/10* (2006.01)

(52) U.S. Cl.
  CPC .......... *A47J 43/20* (2013.01); *A47J 37/067* (2013.01); *A47J 37/101* (2013.01); *A47J 37/10* (2013.01)

(58) Field of Classification Search
  CPC .. A47J 37/067; A47J 37/0676; A47J 37/0682; A47J 37/10; A47J 37/101

USPC .................. 99/422, 349, 353, 351, 426, 439
See application file for complete search history.

(56) References Cited

U.S. PATENT DOCUMENTS

| | | | | |
|---|---|---|---|---|
| 4,697,504 A | * | 10/1987 | Keating | A47J 37/0611 126/41 R |
| 5,197,377 A | * | 3/1993 | Jennings | A47J 37/0611 99/331 |
| 6,539,839 B1 | * | 4/2003 | Tippmann | A47J 37/067 99/331 |
| 6,736,051 B2 | * | 5/2004 | Frantz | A47J 37/0864 99/349 |
| 8,899,146 B2 | * | 12/2014 | Hess | A47J 37/0635 99/422 |
| 2006/0162575 A1 | * | 7/2006 | Lee | A47J 37/0676 99/450 |

* cited by examiner

*Primary Examiner* — Reginald L Alexander
(74) *Attorney, Agent, or Firm* — Faegre Baker Daniels LLP (57) ABSTRACT

A cover positionable over a food item placed atop a cooking surface to provide downward pressure on the food item to facilitate achieving flush contact with the undersurface of the food item on the cooking surface below is disclosed. In an exemplary embodiment of the present disclosure, a sheet of chainmail is secured to a frame which is hingedly supported above a heatable cooking surface. A support which allows the cover of the present disclosure to be easily retrofit to an existing cooking device such as a griddle may be utilized to hingedly support the frame relative to the cooking device.

31 Claims, 6 Drawing Sheets

FIG_5

FIG_6

FIG. 7

FIG_8

FIG_9

COVER FOR FOOD ITEMS PLACED ON A COOKING SURFACE

CROSS-REFERENCE TO RELATED APPLICATION

This application claims the benefit under Title 35, U.S.C. § 119(e) of U.S. Provisional Patent Application Ser. No. 62/030,219 filed Jul. 29, 2014 and entitled COVER FOR FOOD ITEMS PLACED ON A COOKING SURFACE, the entire disclosure of which is hereby expressly incorporated by reference herein.

FIELD OF THE DISCLOSURE

Present disclosure relates to a cover usable for positioning over food items placed on a cooking surface, and, more particularly, to a cover incorporating a flexible top surface which can conform to food items placed therebeneath and to such a cover which can be easily retrofit to an existing cooking device such as a grill or griddle.

BACKGROUND

Cooking devices such as grills and griddles provide a heatable cooking surface on which food items can be placed. For example, griddles may be used to cook meats such as ground beef patties and the like for the preparation of hamburgers and other sandwiches. In such a circumstance, the heated cooking surface of the griddle may also be utilized to toast the opposing sides of a bun or other bread product into which the cooked meat will be positioned to create a hamburger or other sandwich.

Figure 1:
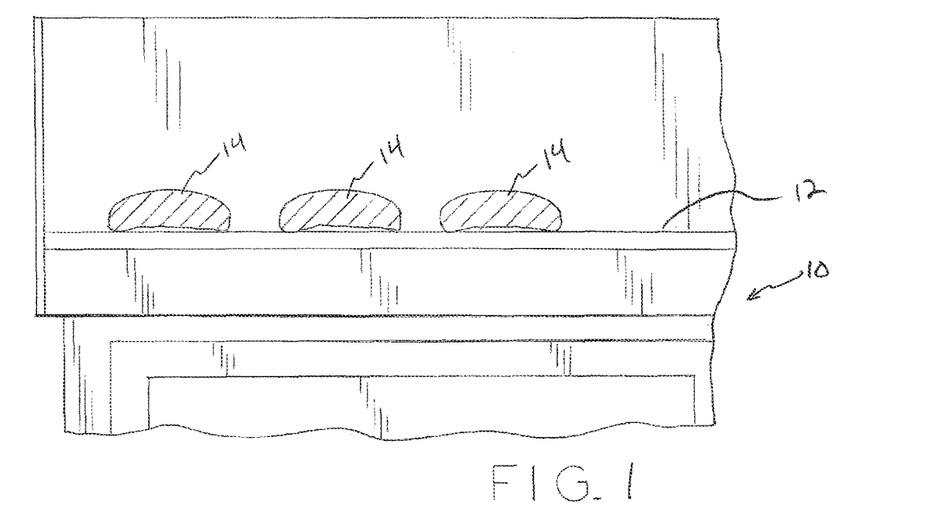
FIG. 1 is a partial front elevational view of a griddle having a plurality of bun crowns positioned thereon.
Figure 2:
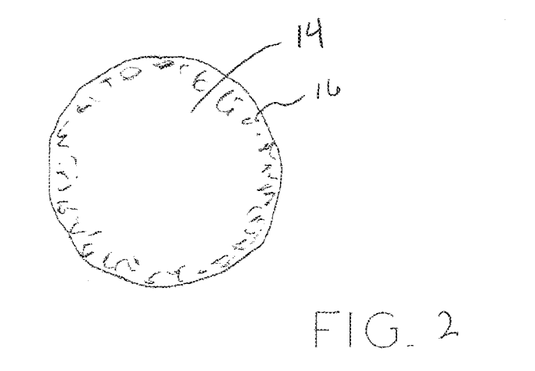
FIG. 2 is a bottom elevational view illustrating toasting of the bun crowns illustrated in FIG. 1.

Buns and other bread products used in making hamburgers and other sandwiches often do not present a flat bottom surface for placement against the heatable cooking surface of a cooking device such as a griddle. Referring to FIG. 1, griddle 10 presents heatable cooking surface 12 on which food items such as crowns 14 of hamburger buns can be positioned. As illustrated in FIG. 1, the undersurfaces of crowns 14 may not be flat, such that a gap exists between the undersurface of crowns 14 and cooking surface 12 when crowns 14 are positioned atop cooking surface 12. When this happens, cooking surface 12 is only able to toast crowns 14 such that toasted outer periphery 16 is created, leaving the central region of the undersurface of crowns 14 untoasted.

SUMMARY

The present disclosure relates to a cover positionable over a food item placed atop a cooking surface to provide downward pressure on the food item to facilitate achieving flush contact with the undersurface of the food item on the cooking surface below. In an exemplary embodiment of the present disclosure, a sheet of chainmail (sometimes simply referred to as maille) is secured to a frame which is hingedly supported above a heatable cooking surface. A support which allows the cover of the present disclosure to be easily retrofit to an existing cooking device such as a griddle may be utilized to hingedly support the frame relative to the cooking device.

A support of certain embodiments of the present disclosure cannot only be easily connected to an existing cooking device, but is also sized and shaped to be unassistedly, manually, removeably supported by the cooking device such that the support can be separated from the cooking device by hand without the assistance of a tool such as a lever, mallet, etc. In general, such a support is held by gravity and friction to the cooking device but not in an amount that cannot be overcome by a typical user by hand, without the assistance of tools to provide a mechanical advantage.

In one form thereof, the present disclosure provides a cover for covering a food item placed on a cooking surface, the cover including: a support comprising a wall forming a channel and a first hinge half; a frame comprising a second hinge half cooperating with the first hinge half of the support to hingedly connect the frame to the support, a sheet of chainmail secured to the frame and spanning an interior circumscribed by the frame.

In another form thereof, the present disclosure provides a food preparation device, including: a cooking device comprising a heatable cooking surface; a cover, including: a support unassistedly, manually, removeably supported by the cooking device, whereby the support can be separated from the cooking device by hand without the assistance of a tool, the support having a first hinge half; and a frame having a second hinge half cooperating with the first hinge half of the support to hingedly connect the frame to the support, a sheet of chainmail secured to the frame and spanning an interior circumscribed by the frame, the frame rotatable from a first position covering the cooking surface to a second position allowing access to the cooking surface.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description of exemplary embodiments presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate exemplary and alternative examples of how the disclosure may be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, and such exemplifications are not to be construed as limiting the scope of the invention in any manner.

DETAILED DESCRIPTION

The embodiments disclosed herein are not intended to be exhaustive or to limit the invention to the precise forms disclosed in the following detailed description. Rather, the embodiments are chosen and described so that others skilled in the art may utilize their teachings.

Figure 3:
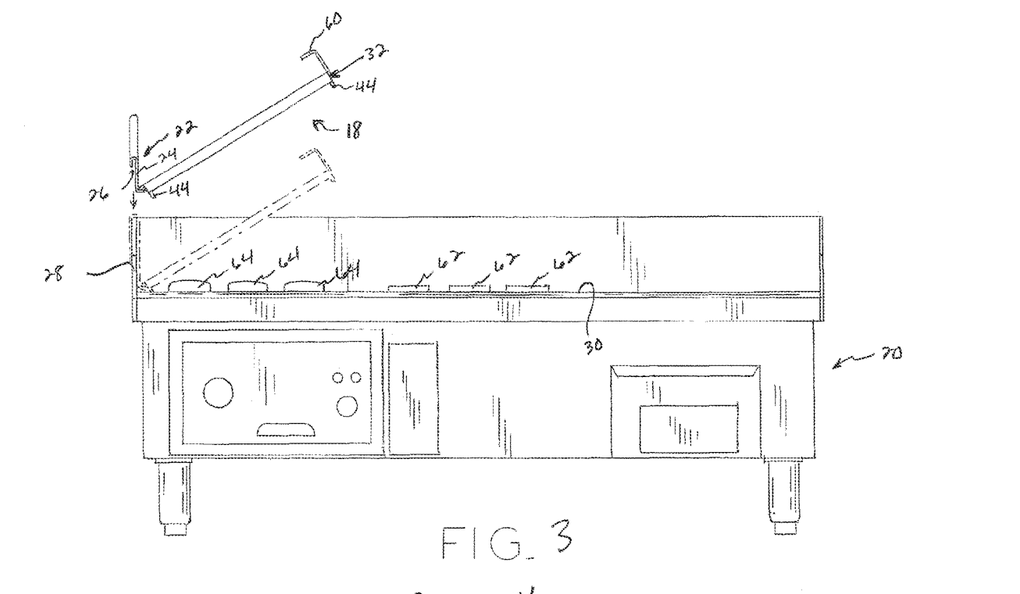
FIG. 3 is a front elevational view of a griddle illustrating the retrofitting of a cover of the present disclosure thereto.
Figure 4:
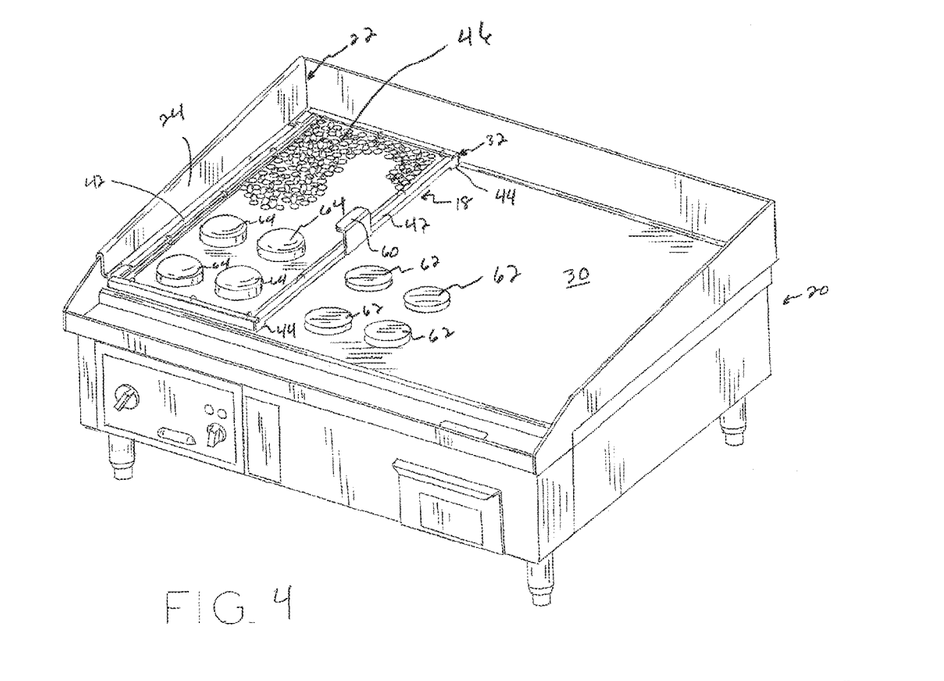
FIG. 4 is a perspective view of the griddle of FIG. 3 showing a cover of the present disclosure operably retrofit thereto.

Referring to FIGS. 3 and 4, griddle 20 is shown together with cover 18. Griddle 20 may be, for example, an ACCU-STEAM griddle available from AccuTemp Products, Inc. of Fort Wayne, Ind. As illustrated in FIG. 3, cover 18 may be easily connected to griddle 20 so that griddle 20 is retrofittable with cover 18. Specifically, support 22 of cover 18 includes a generally U-shaped wall 24 forming channel 26 into which upstanding wall 28 of griddle 20 can be positioned to support 22. Upstanding wall 28 is a common feature of griddles and serves as a "splash shield" to prevent food items and the by-products of cooking the same from inadvertently leaving cooking surface 30. Because the cover of the present disclosure is designed to be joined to a griddle by way of such a common griddle feature, the cover of the present disclosure is easily retrofit to many griddles, without modification of the griddle.

Figure 10:
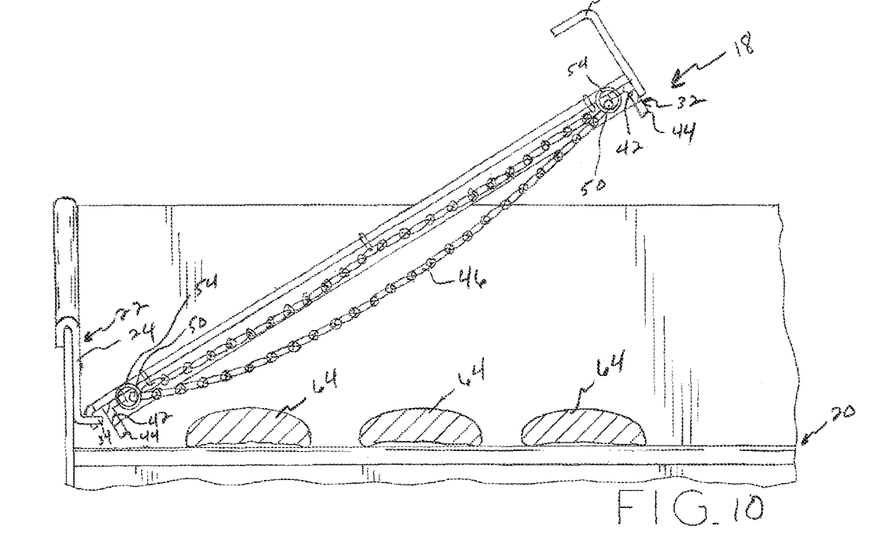
FIG. 10 is a partial elevational, sectional view of a griddle incorporating a cover of the present disclosure showing the cover rotated away from the cooking surface of the griddle.

With upstanding wall 28 of griddle 20 positioned in channel 26 formed by wall 24 of support 22, support 22 is supported above cooking surface 30 of griddle 20. As described in further detail below, frame 32 is hingedly connected to support 22 and is rotatable from a first position covering cooking surface 30 (see e.g., FIGS. 4, 5, 8, and 11) to a second position rotated away from the cooking surface to allow access to the cooking surface. FIGS. 6 and 10 illustrate rotation of frame 32 from the first position covering cooking surface 30 toward a second position allowing access to cooking surface 30. In these illustrations, frame 32 is rotated to an angle of about 45° relative to cooking surface 30. Exemplary embodiments of the present disclosure, a second "fully open" position of frame 32 will be associated with frame 32 forming an angle of more than 90° with cooking surface 30.

With support 22 unassistedly, manually, removeably supported by griddle 20, as described above, support 22 can be separated from griddle 20 by hand without the assistance of a tool, such as a lever, mallet, etc. To facilitate such a configuration, channel 26 is sized to relatively easily receive upstanding wall 28 of griddle 20. Specifically, channel 26 is sized such that upstanding wall 28 of griddle 20 relatively easily fits within channel 26 with relatively low frictional forces experienced therebetween. Specifically, the "relatively low" frictional forces referenced in the preceding sentence are sufficiently low such that they can be overcome by a typical user by hand, without the assistance of tools to provide a mechanical advantage. In one exemplary embodiment, this relatively low frictional forces are facilitated by providing a non-interference fit between wall 28 and channel 26 having a ±0.005" tolerance, such that the clearance between wall 28 and channel 26 is up to 0.011" and at least 0.001". Generally speaking, support 22 is held in place atop upstanding wall 28 of griddle 20 by gravity.

Figure 7:
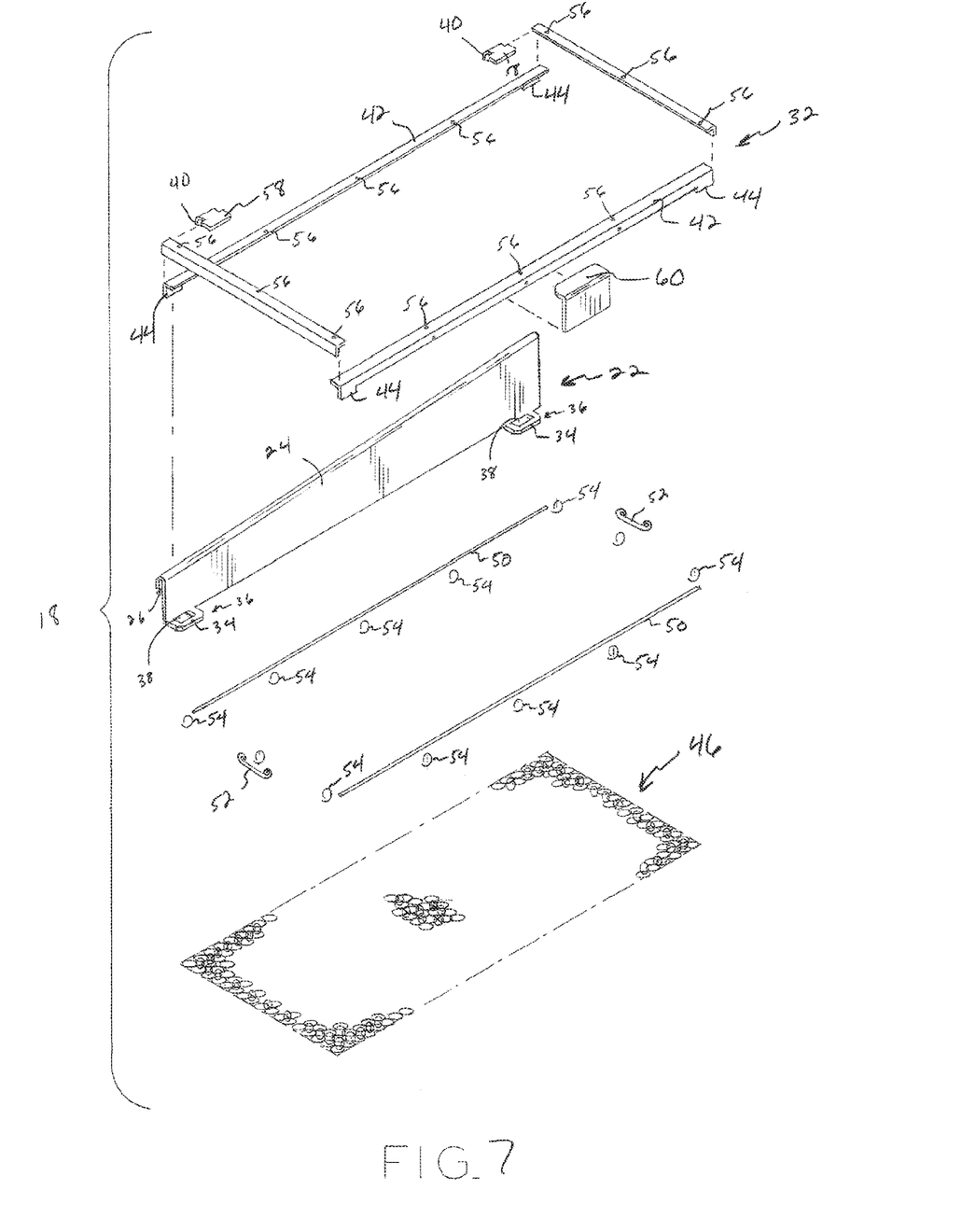
FIG. 7 is an exploded view of the cover of the present disclosure.

Referring FIG. 7, support 22 includes extensions 34 extending from wall 24 to define first hinge halves 36. Specifically, extensions 34 include slots 38 which will cooperate with tabs associated with frame 32 (as described in further detail below) to hingedly connect frame 32 to support 22.

Figure 5:
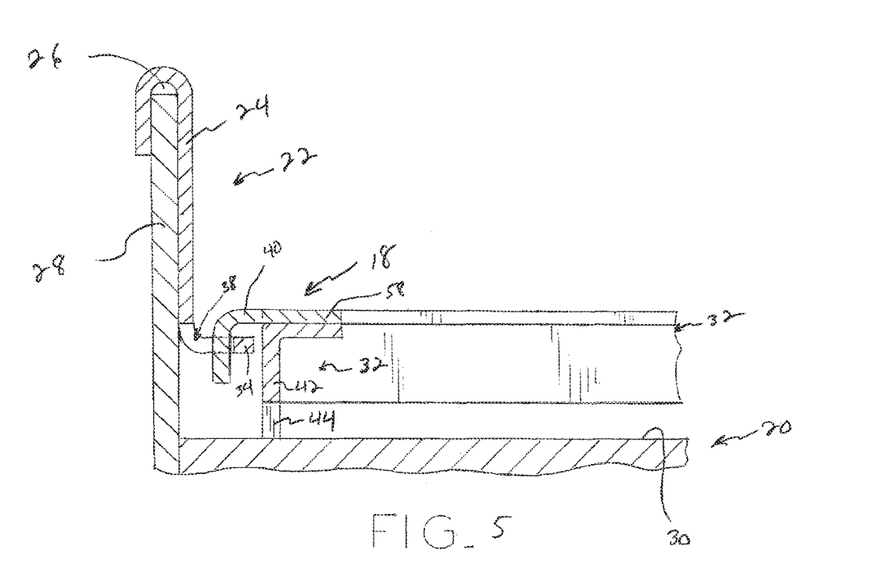
FIG. 5 is a partial sectional view of a griddle incorporating a cover of the present disclosure taken along the section line shown in FIG. 8, described below.
Figure 6:
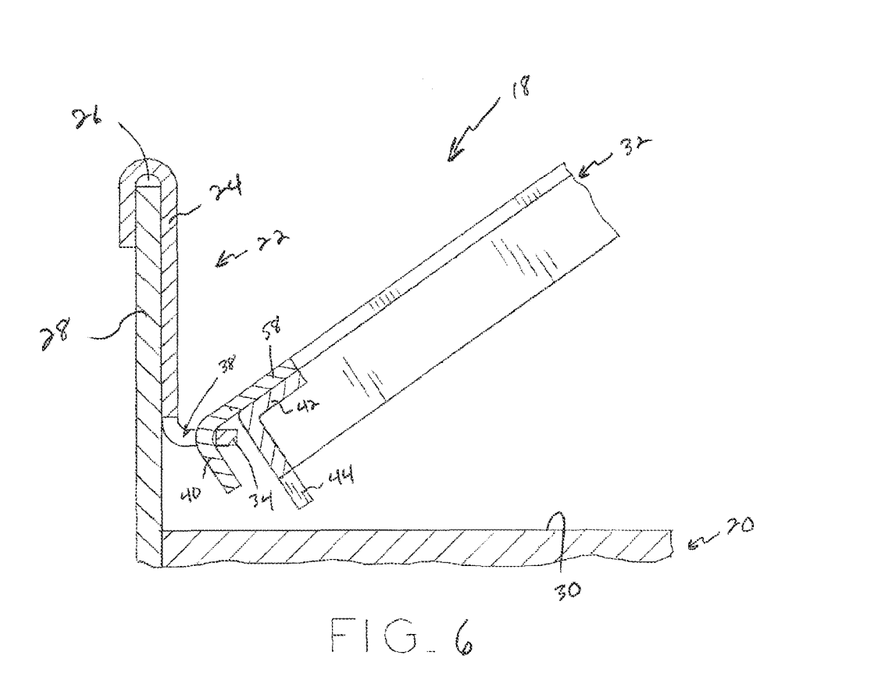
FIG. 6 is a partial sectional view similar to FIG. 5, but showing the cover of the present disclosure rotated away from the cooking surface of the griddle.

As illustrated in FIGS. 5 and 6, with upstanding wall 28 of griddle 20 positioned in channel 26 of support 22, extensions 34 are supported above heatable cooking surface 12 of griddle 20. In this position, tabs 40 extending from frame 32 can be positioned into slots 38 as illustrated, e.g., in FIG. 8. As illustrated in FIGS. 5 and 6, tabs 40 comprise curved tabs having a curvature in a plane perpendicular to extensions 34 (which is also perpendicular to cooking surface 30). As frame 32 is rotated from its first position covering cooking surface 12 (FIG. 5) toward its second position allowing access to cooking surface 12, the inwardly facing surface of extension 34 which defines each slot 38 rides against the curvature of a tab (40) to create a hinge between frame 32 and support 22. Specifically, with this structure, frame 32 includes second hinge halves in the form of tabs 40 which are sized for insertion into slots 38 of the first hinge halves to cooperate to form hinges to hingedly support frame 32 relative to griddle 10. The material thickness of tab 40 is less than the width of the adjacent slot 38 to provide a hinge clearance which prevents binding upon hinging of the mated tab and slot extensions. With such a structure, frame 32 is unassistedly, manually, removeably hingedly connected to support 22. Stated another way, frame 32 can be removed from connection to support 22 simply by lifting frame 32 vertically (i.e., without the rotation of FIG. 6), thereby lifting tabs 40 out of slots 38. Such detachment may be unassistedly manually accomplished in that a typical user may complete such detachment without the assistance of tools to e.g., provide a mechanical advantage.

Referring to FIG. 7, side members 42 of frame 32 include feet 44 extending downwardly from opposing ends thereof to space frame 32 from cooking surface 30 as described below. As illustrated in FIGS. 4, 5, 8 and 11, each foot 44 rests atop cooking surface 30 when frame 32 is rotated into its first position covering cooking surface 30. In this position, tabs 40 can be positioned within slots 38 such that tabs 40 do not contact extensions 34 (see, e.g., FIG. 5). In this way, contact of feet 44 with cooking surface 30 dictates spacing of frame 32 above cooking surface 30. The height of extension 34 above the cooking surface 30 is set such that the internal surface radius defined at the junction of tab 40 and tab base 58 contacts extension 34 shortly after frame 32 is rotated from its closed position toward its open position, as shown in FIG. 6. This provides smooth operation when lifting frame 32.

As illustrated, e.g., in FIGS. 4, 8, 10 and 11, frame 32 includes chainmail sheet 46 secured thereto. As illustrated, chainmail sheet 46 defines an undeformed extent that is larger than the interior circumscribed by frame 32. Stated another way, if chainmail sheet 46 is laid flat and stretched as far outwardly as possible without deformation of the individual rings forming chainmail sheet 46, then chainmail sheet 46 defines a rectangular periphery, the outward extent of which is larger than the interior circumscribed by frame 32. In such a configuration, chainmail sheet 46 can be secured to frame 32 such that the sheet of chainmail 46 is slack, i.e., it is able to sag relative to frame 32 as illustrated, e.g., in FIGS. 10 and 11.

Figure 9:
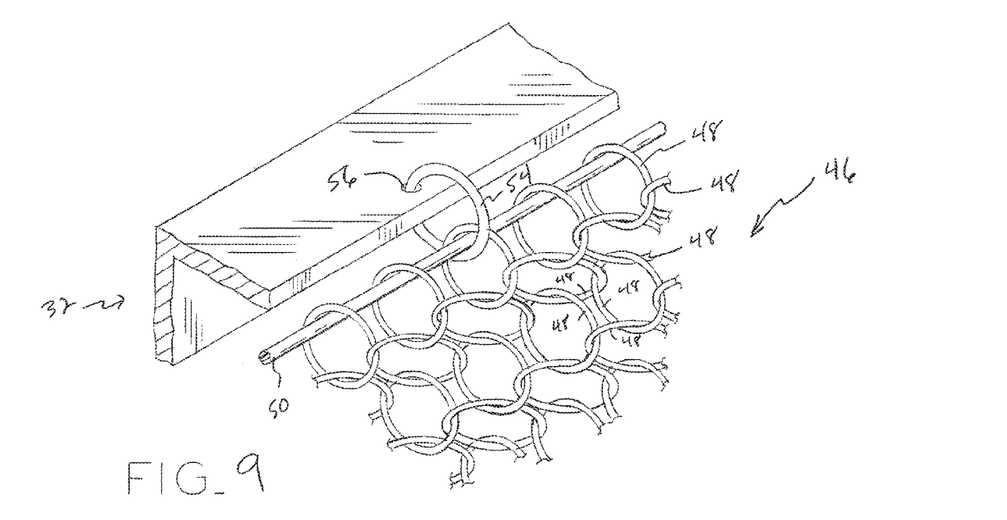
FIG. 9 is a partial perspective view of the frame and chainmail sheet, which form a part of an exemplary embodiment of the present disclosure.

Chainmail sheet 46 comprises a metal mesh formed by a series of interconnected rings 48 as illustrated in detail in FIG. 9. In an exemplary embodiment of the present disclosure, chainmail sheet 46 is formed by an interjoined mesh of 304 stainless steel, 21 gauge rings each having a 0.22" inner diameter. In general, cover 18 may be formed of all stainless steel components.

As illustrated in FIGS. 8-11, a rod 50 is positioned along each opposing lengthwise side of chainmail sheet 46. Specifically, each rod 50 is positioned through a plurality of rings 48 forming the long sides of chainmail sheet 46, as shown in detail in FIG. 9. Rods 50 are, in an exemplary embodiment, 14 gauge stainless steel rods. Lengthwise rods 50 have a length about equal to the length of the long side of chainmail sheet 46 at its maximum undeformed length. Referring to FIG. 7, widthwise rods 52 may similarly be utilized along the short sides of chainmail sheet 46. In an exemplification of the present disclosure, chainmail sheet 46 is approximately 11.5 inches by 23 inches in an expanded, undeformed state. In such an embodiment, lengthwise rods 50 have a length of about 23.5". However, widthwise rods 52 have a length of only about 1.5". In one exemplary embodiment, widthwise rods 52 have a length that is no more than 20% of the maximum undeformed width of chainmail sheet 46. Widthwise rods 52 are located in a central portion of a side of chainmail sheet 46 defining the width of chainmail sheet 46.

As illustrated in FIG. 7, the ends of rods 52 may be bent into a q-shape to prevent them from sliding out from rings 48 of chainmail sheet 46 during use. Along the short side of chainmail sheet 46, widthwise rods 52 do not extent the full length of the chainmail so as to let the chainmail hang as loosely as possible along the width of the frame while also preventing bunching of the chainmail on a particular side of the food product positioned underneath. The q-shaped ends of widthwise rods 52 may similarly be implemented with lengthwise rods 50 to prevent rods 50 from being withdrawn from rings 48 of chainmail sheet 46.

Figure 8:
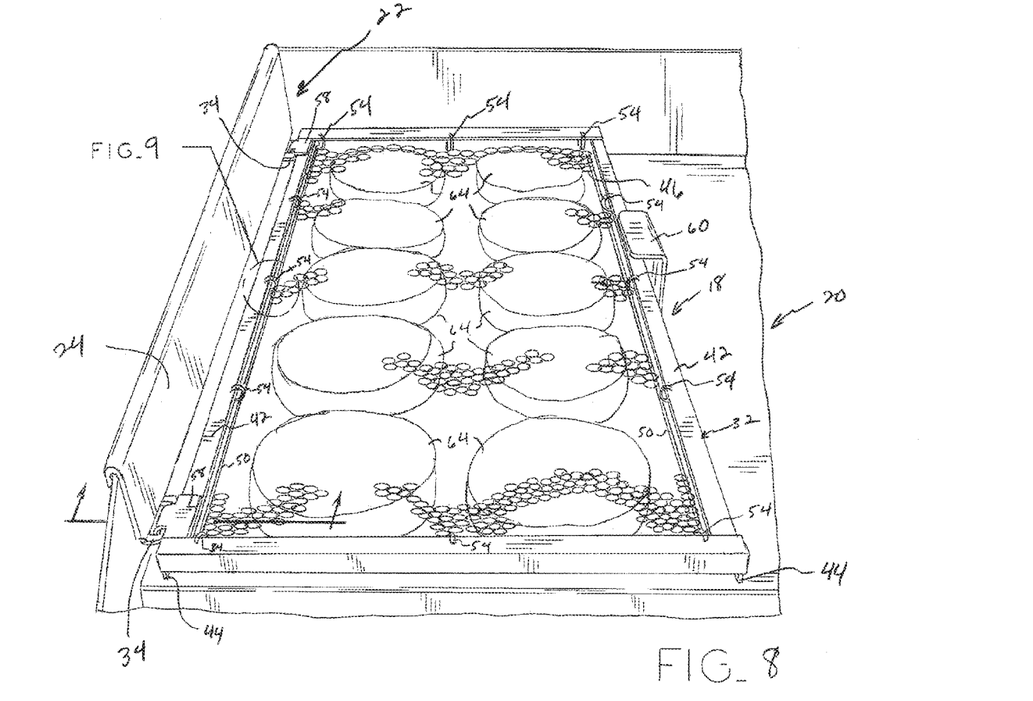
FIG. 8 is a partial perspective view of a griddle incorporating the cover of the present disclosure, which is shown placed atop food items on the griddle.

With rods 50, 52 positioned through rings 48 of chainmail sheet 46 and secured from removal therefrom by deforming the ends of rods 50, 52 into q-shapes, as described above, chainmail sheet 46 is connected to frame 32 via connecting rings 54, as illustrated, e.g., in FIGS. 8 and 9. Specifically, connecting rings 54 comprise open rings which can be positioned with one end of the connecting ring inserted through the central aperture of a ring 48 of chainmail sheet 46. As illustrated in FIG. 9, connecting rings may also be inserted such that rods 50 are positioned interior of connecting rings 54. Connecting rings 54 are further positioned through connecting apertures 56 formed in frame 32. To complete affixation of chainmail sheet 46 to frame 32, the connecting rings 54 may be deformed until the ends thereof are placed in close proximity and/or overlapped.

As illustrated in the figures, e.g., FIG. 7, frame 32 is generally made of four pieces of angled stainless steel which are interconnected at their ends to form a rectangular frame. The ends of the interconnected members forming frame 32 may be secured to one another, e.g., by welding. Similarly, tabs 40, which extend from tab bases 58, may be welded to frame 32. Finally, handle 60, which may be utilized to facilitate rotating cover 18 from the first position covering cooking surface 30 to a second position allowing access to cooking surface 30, may be welded to frame 32. As indicated above, all of the components forming cover 18 may be made of stainless steel.

Figure 11:
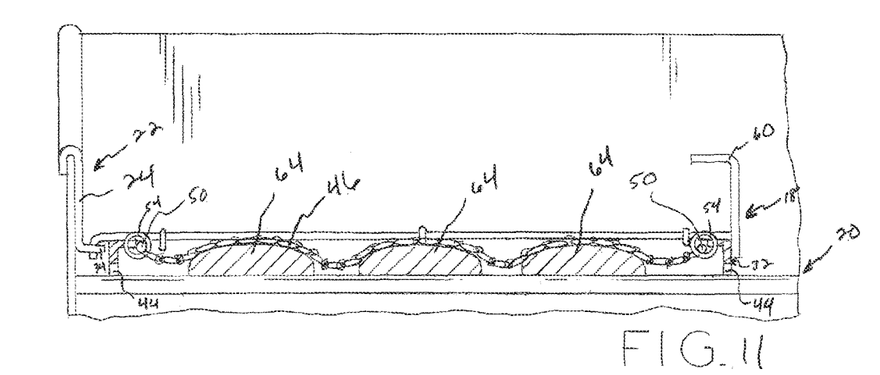
FIG. 11 is a partial elevational, sectional view of a griddle incorporating a cover of the present disclosure showing the cover positioned atop the cooking surface of the griddle.
Figure 12:
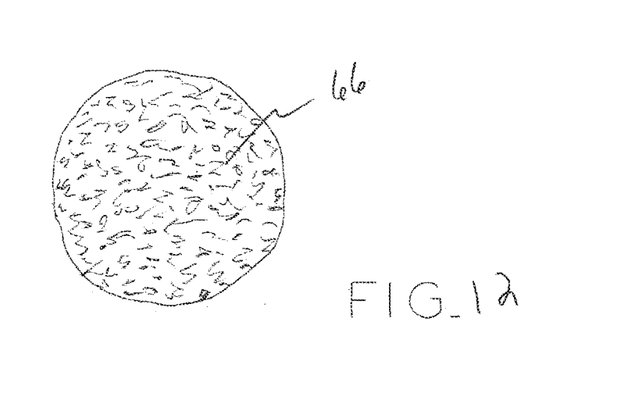
FIG. 12 is a bottom elevational view illustrating toasting of the bun crowns illustrated in FIG. 11.

In use, food products such as ground beef patties 62 and buns 64 (FIG. 4) may be placed atop cooking surface 30 of griddle 20 for cooking and toasting, respectively. To place buns 64 atop cooking surface 30, cover 18 is rotated away from cooking surface 30 into a second position allowing access to cooking surface 30. In this position, buns 64 are positioned atop cooking surface 30 and cover 18 is lowered into engagement with buns 64, as illustrated, in FIGS. 10 and 11 (and as further seen, e.g., in FIG. 8). As illustrated in FIG. 10, before engagement with buns 64, the bottom surface of buns 64 is not uniformly engaged with cooking surface 30 of griddle 22. As cover 18 is lowered into position atop buns 64, chainmail sheet 46 (shown sagging from frame 32 in FIG. 10) comes into engagement with buns 64. As chainmail sheet 46 encounters buns 64, chainmail sheet 64 is draped over and engages a top surface of buns 64, as illustrated in FIG. 11. In this position, the weight of chainmail sheet 64 applies a uniform downward force to buns 64, urging the entire under surface of buns 64 in flush contact with cooking surface 30 of griddle 20 to allow for a uniformly toasted under surface 66.

While the present disclosure has been described as having exemplary designs, the present disclosure can be further modified within the spirit and scope of this disclosure. This application is therefore intended to cover any variations, uses or adaptations of the disclosure using its general principles. Further, this application is intended to cover such departures from the present disclosure as come within known or customary practice in the art to which this disclosure pertains.

What is claimed is:

1. A food preparation device, comprising:
    a cooking device comprising a heatable cooking surface;
    a cover, comprising:
        a support unassistedly, manually, removeably supported by said cooking device, whereby said support can be separated from said cooking device by hand without the assistance of a tool, said support comprising a first hinge half;
        a frame comprising a second hinge half cooperating with the first hinge half of the support to hingedly connect said frame to said support, a sheet of chainmail secured to said frame and spanning an interior circumscribed by said frame, said sheet of chainmail comprising a first plurality of loops, said frame rotatable from a first position covering the cooking surface to a second position allowing access to the cooking surface; and
        a rod positioned through said first plurality of loops of the chainmail sheet.

2. The food preparation device of claim 1, wherein said second hinge half of said frame cooperates with said first hinge half of said support to unassistedly, manually, removeably, hingedly connect said frame to said support.

3. The food preparation device of claim 2, wherein said support comprises an extension extending above the heatable cooking surface, the extension defining a slot comprising the first hinge half, and wherein said frame comprises a tab extending therefrom comprising the second hinge half, said tab sized for insertion into said slot, said tab inserted into said slot, said slot and said tab cooperating to form a hinge to hingedly support said frame relative to said cooking device.

4. The food preparation device of claim 3, wherein said tab comprises a curved tab, said curved tab having a curvature in a plane perpendicular to said extension when said curved tab is inserted into said slot of said extension.

5. The food preparation device of claim 3, wherein said support comprises a second extension extending above the heatable cooking surface, the second extension defining a second slot defining a second extension hinge half, and wherein said frame comprises a second tab extending therefrom comprising a second tab hinge half, said second tab inserted into said second slot, said second slot and said second tab cooperating to form a second hinge to further hingedly support said frame relative to said cooking device.

6. The food preparation device of claim 1, wherein said sheet of chainmail defines an undeformed extent that is larger than the interior circumscribed by said frame, said sheet of chainmail secured to said frame such that said sheet of chainmail is slack, whereby said chainmail is able to sag relative to said frame.

7. The food preparation device of claim 1, said sheet of chainmail comprising a second plurality of loops, further comprising a second rod positioned through said second plurality of loops of the chainmail.

8. The food preparation device of claim 1, wherein said frame further comprises a foot extending from said frame to space said frame from said cooking surface when said frame maintains said first position.

9. The food preparation device of claim 1, wherein said frame further comprises a handle extending upwardly from said frame when said frame maintains said first position.

10. The food preparation device of claim 1, wherein said sheet of chainmail comprises a 304 stainless steel sheet of chainmail.

11. The food preparation device of claim 1, wherein said sheet of chainmail comprises an interjoined mesh of 21 gauge stainless steel rings.

12. The food preparation device of claim 1, wherein said cooking device includes an upstanding wall at a periphery of the cooking surface and wherein said support forms a channel into which said upstanding wall can be positioned to unassistedly, manually, removeably support said support above the cooking surface.

13. The food preparation device of claim 1, wherein the rod is positioned through the first plurality of loops of the chainmail sheet at an edge of the chainmail sheet.

14. The food preparation device of claim 13, said sheet of chainmail comprising a second plurality of loops, further comprising a second rod positioned through the second plurality of loops of the chainmail sheet at a second edge of the chainmail sheet.

15. A cover for covering a food item placed on a cooking surface, the cover comprising:
a support comprising a wall forming a channel and a first hinge half;
a frame comprising a second hinge half cooperating with the first hinge half of the support to hingedly connect said frame to said support, a sheet of chainmail secured to said frame and spanning an interior circumscribed by said frame, said sheet of chainmail comprising a first plurality of loops, further comprising a rod positioned through said first plurality of loops of the chainmail.

16. The cover of claim 15, wherein said channel is sized to receive an upstanding wall of a cooking device to unassistedly, manually, removeably support said support above the cooking surface.

17. The cover of claim 15, wherein said second hinge half of said frame cooperates with said first hinge half of said support to unassistedly, manually, removeably, hingedly connect said frame to said support.

18. The cover of claim 15, wherein said wherein said support comprises an extension defining a slot comprising of first hinge half, and wherein said frame comprises a tab extending therefrom comprising the second hinge half, said tab sized for insertion into said slot, said tab inserted into said slot, said slot and said tab cooperating to form a hinge to hingedly connect said frame to said support.

19. The cover of claim 18, wherein said tab comprises a curved tab, said curved tab having a curvature in a plane perpendicular to said extension when said tab is inserted into said slot of said extension.

20. The cover of claim 18, wherein said support comprises a second extension, the second extension defining a second slot defining a second extension hinge half, and wherein said frame comprises a second tab extending therefrom comprising a second tab hinge half, said second tab inserted into said second slot, said second slot and said second tab cooperating to form a second hinge to further hingedly connect said frame to said support.

21. The cover of claim 20, wherein said tab comprises a curved tab, said curved tab having a curvature in a plane perpendicular to said extension when said curved tab is inserted into said slot of said extension, and wherein said second tab comprises a second curved tab, said second curved tab having a curvature in a plane perpendicular to said second extension when said second curved tab is inserted into said second slot of said second extension.

22. The cover of claim 15, wherein said sheet of chainmail defines an undeformed extent that is larger than the interior circumscribed by said frame, said sheet of chainmail secured to said frame such that said sheet of chainmail is slack, whereby said chainmail is able to sag relative to said frame.

23. The cover of claim 15, said sheet of chainmail comprising a second plurality of loops, further comprising a second rod positioned through said second plurality of loops of the chainmail sheet.

24. The cover of claim 15, wherein said frame further comprises a foot extending from said frame.

25. The cover of claim 15, wherein said frame further comprises a handle extending upwardly from said frame.

26. The cover of claim 15, wherein said sheet of chainmail comprises a 304 stainless steel sheet of chainmail.

27. The cover of claim 15, wherein said sheet of chainmail comprises an interjoined mesh of 21 gauge stainless steel rings.

28. The cover of claim 15, wherein the rod is positioned through the first plurality of loops of the chainmail sheet at an edge of the chainmail sheet.

29. The cover of claim 28, said sheet of chainmail comprising a second plurality of loops, further comprising a second rod positioned through the second plurality of loops of the chainmail sheet at a second edge of the chainmail sheet.

30. A food preparation device, comprising:
 a cooking device comprising a heatable cooking surface;
 a cover, comprising:
  a support unassistedly, manually, removeably supported by said cooking device, whereby said support can be separated from said cooking device by hand without the assistance of a tool, said support comprising a first hinge half; and
  a frame comprising a second hinge half cooperating with the first hinge half of the support to hingedly connect said frame to said support, a sheet of chainmail secured to said frame and spanning an interior circumscribed by said frame, said frame rotatable from a first position covering the cooking surface to a second position allowing access to the cooking surface, wherein said sheet of chainmail defines a rectangular periphery defining a first long side having a first long side length, a second long side having a second long side length, a first short side having a first short side length and a second short side having a second short side length and wherein said food preparation device further comprises:
 a first rod positioned through a plurality of loops of the chainmail sheet at said first long side and secured to said chainmail sheet, said first rod having a first rod length, said first rod length about equal to said first long side length of said chainmail sheet;
 a second rod positioned through a plurality of loops of the chainmail sheet at the second long side and secured to said chainmail sheet, said second rod having a second rod length, said second rod length about equal to said second long side length of said chainmail sheet;
 a third rod positioned through a plurality of loops of the chainmail sheet at the first short side and secured to said chainmail sheet, said third rod having a third rod length, said third rod length no more than 20% of the first short side length of said chainmail sheet; and
 a fourth rod positioned through a plurality of loops of the chainmail sheet at the second short side and secured to said chainmail sheet, said fourth rod having a fourth rod length, said fourth rod length no more than 20% of the second short side length of said chainmail sheet.

31. A cover for covering a food item placed on a cooking surface, the cover comprising:
 a support comprising a wall forming a channel and a first hinge half;
 a frame comprising a second hinge half cooperating with the first hinge half of the support to hingedly connect said frame to said support, a sheet of chainmail secured to said frame and spanning an interior circumscribed by said frame; wherein said sheet of chainmail defines a rectangular periphery defining a first long side having a first long side length, a second long side having a second long side length, a first short side having a first short side length and a second short side having a second short side length and wherein said food preparation device further comprises:
 a first rod positioned through a plurality of loops of the chainmail sheet at said first long side and secured to said chainmail sheet said first rod having a first rod length, said first rod length about equal to said first long side length of said chainmail sheet;
 a second rod positioned through a plurality of loops of the chainmail sheet at the second long side and secured to said chainmail sheet, said second rod having a second rod length, said second rod length about equal to said second long side length of said chainmail sheet;
 a third rod positioned through a plurality of loops of the chainmail sheet at the first short side and secured to said chainmail sheet, said third rod having a third rod length, said third rod length no more than 20% of the first short side length of said chainmail sheet; and
 a fourth rod positioned through a plurality of loops of the chainmail sheet at the second short side and secured to said chainmail sheet, said fourth rod having a fourth rod length, said fourth rod length no more than 20% of the second short side length of said chainmail sheet.

* * * * *